(12) United States Patent
Gibbison

(10) Patent No.: US 8,123,953 B2
(45) Date of Patent: Feb. 28, 2012

(54) USE OF PVPP TO REMOVE CONTAMINANTS FROM PRODUCED WATER OF AN OIL OR GAS WELL

(75) Inventor: Robert Gibbison, Maidstone (GB)

(73) Assignee: ISP Investments Inc., Wilmington, DE (US)

( * ) Notice: Subject to any disclaimer, the term of this patent is extended or adjusted under 35 U.S.C. 154(b) by 559 days.

(21) Appl. No.: 12/280,165

(22) PCT Filed: Feb. 23, 2007

(86) PCT No.: PCT/US2007/004725
§ 371 (c)(1),
(2), (4) Date: Sep. 9, 2008

(87) PCT Pub. No.: WO2007/010658
PCT Pub. Date: Sep. 7, 2007

(65) Prior Publication Data
US 2010/0237010 A1 Sep. 23, 2010

Related U.S. Application Data

(60) Provisional application No. 60/776,766, filed on Feb. 24, 2006.

(51) Int. Cl.
*C02F 1/28* (2006.01)
*C02F 101/30* (2006.01)

(52) U.S. Cl. ......... 210/692; 166/267; 210/735; 210/909
(58) Field of Classification Search ................... 210/692
See application file for complete search history.

(56) References Cited

U.S. PATENT DOCUMENTS

| 3,951,792 A * | 4/1976 | Azorlosa et al. ............... 210/728 |
| 3,962,110 A * | 6/1976 | Tate ............................. 252/181 |
| 4,644,020 A * | 2/1987 | Stahl ............................ 522/79 |
| 4,764,588 A | 8/1988 | Smith et al. |
| 4,820,420 A * | 4/1989 | Hums et al. .................... 210/669 |
| 5,702,613 A * | 12/1997 | Sommese et al. ............. 210/708 |
| 5,730,882 A * | 3/1998 | Gallup et al. ................. 210/708 |
| 6,548,597 B2 | 4/2003 | Hood et al. |
| 7,485,225 B2 * | 2/2009 | Krogue et al. ................ 210/263 |
| 7,758,757 B2 * | 7/2010 | Lee ............................... 210/691 |
| 2005/0282202 A1 | 12/2005 | Brolaski et al. |

OTHER PUBLICATIONS

PCT, International Search Report and Written Opinion, PCT/US2007/004725 (Sep. 27, 2007).

* cited by examiner

*Primary Examiner* — Peter A Hruskoci
(74) *Attorney, Agent, or Firm* — Thompson Hine LLP

(57) ABSTRACT

In accordance with the present invention there is provided a method of removing acidic and/or aromatic contaminants, such as benzene, xylene, toluene, phenols and polyphenols, from produced water of an oil or gas well. The method comprises the step of contacting the produced water with polyvinylpolypyrrolidone (PVPP) to remove the contaminants from said water.

4 Claims, No Drawings

USE OF PVPP TO REMOVE CONTAMINANTS FROM PRODUCED WATER OF AN OIL OR GAS WELL

FIELD OF THE INVENTION

The present invention relates to a method for removing contaminants from produced water of an oil or gas well.

BACKGROUND OF THE INVENTION

Oil and gas wells frequently produce a mixed stream of gas, liquid hydrocarbons and water. The mixed stream flows or is pumped to the surface and separated using conventional separating systems. After recovery of the oil and/or gas, the produced water often is reinjected into a disposal well or otherwise recycled or disposed of.

Concerns over possible contamination of the water supply through the presence of oil and other contaminants in the produced water has risen dramatically in recent years. The produced water may contain contaminants such as, for example, difficult to remove aromatics such as benzene, xylene, toluene, phenols and polyphenols. Many governmental authorities require such contaminants to be removed from the produced water before reinjection into a disposal well or other disposition. The level of contamination permitted by government regulation varies. In some older wells recovered oil may be 10% or less of a well's total output and produced water 90% or higher, making it particularly difficult to remove these contaminants from the produced water.

What is needed is a simple economical method for removing contaminants form the produced water.

SUMMARY OF THE INVENTION

We have discovered a simple economical method for removing aromatic and/or acid contaminants such as benzene, xylene, toluene, phenols and polyphenols from the produced water of an oil or gas well. In accordance with the invention, there is provided a method of removing contaminants from produced water of an oil or gas well comprising the step of contacting the produced water with polyvinylpolypyrrolidone (PVPP) to remove the contaminants from the water.

DETAILED DESCRIPTION OF PREFERRED EMBODIMENTS

While the invention herein is described with particular reference to a preferred embodiment, i.e., for removing aromatic acidic contaminants from the produced water of an oil or gas well, it also finds utility in other applications where water and hydrocarbons are being separated and it is desired to reduce the level of contamination in the water.

According to the invention, aromatic and acid contaminants in the produced water of an oil or gas well are removed by contacting the produced water with polyvinylpolypyrrolidone (PVPP). PVPP, also known as crosslinked poly(N-vinylpyrrolidone), is a crosslinked polymer containing repeating units of the formula:

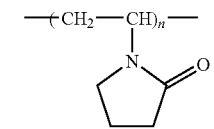

Any suitable crosslinker can be used. The particular crosslinker selected is not believed to be critical to the practice of the invention.

PVPP is known to be a highly effective stabilizer for beer. In the case of beer, non-biological haze formation results primarily from the hydrogen bonding between haze producing proteins and the polyphenol constituents of beer. Colloidal stability is achieved by reducing and/or preventing the formation of polyphenol/protein complexes. PVPP is believed to complex with specific polyphenols in beer via hydrogen bonding and can be removed during subsequent filtration.

Suitable for use in the present invention is PVPP that is known to be useful in stabilizing beer. Such PVPP includes POLYCLAR® 10 and POLYCLAR® SUPER R, both commercially available from International Specialty Products. POLYCLAR® 10 is available as a water insoluble white powder comprising particles having an average size of about 25 microns. POLYCLAR® SUPER R is available as a water insoluble white powder comprising particles having an average size of about 110 microns. Also suitable for use in the present invention is a fine grade PVPP commercially available from International Specialty Products under the trade name ViviPrint PS-10 having an average particle size of about 15 microns. The PVPP can also take the form of particles, including nano-size particles dispersed in polyvinylpyrrolidone. Such compositions can be prepared as described in U.S. Pat. No. 6,548,597, the disclosure of which is hereby incorporated by reference in its entirety, and are commercially available as a viscous liquid (10-12% solids) from International Specialty Products under the trade name ViviPrint 540.

The PVPP can be added as a dry powder or more preferably as a slurry to the produced water either directly, via cross-flow or in a contact vessel. The slurry can be prepared in either hot or cold water. Optimal contact between the PVPP and the contaminated water can be achieved by proportional dosing of the PVPP into the produced water flow or contact vessel. The preferred dosing rate depends, of course, upon the characteristics of the produced water, and, in particular, the composition and concentration of the contaminants. After contact, the PVPP can be separated from the produced water. This can be accomplished by conventional means for separating particles from water including conventional filtration devices.

While applicants do not wish to be bound by any theories, it is believed that acidic or aromatic contaminants such as benzene, xylene, toluene, phenols and polyphenols that inherently exist in produced waters from oil and gas wells form complexes with the PVPP via pi bonds with the nitrogen-containing rings of the PVPP. The large surface area of the water insoluble PVPP particles provides effective complex formation and, consequently, effective contaminant removal.

While a preferred embodiment of the invention has been described for illustrative purposes, it should be understood that many changes, substitutions and modifications will be readily apparent to those skilled in the art in light of the foregoing disclosure without departing from the scope and spirit of the present invention which is defined by the claims which follow.

What is claimed is:

1. A method of removing contaminants from produced water of an oil or gas well comprising the step of contacting said produced water with polyvinylpolypyrrolidone (PVPP) wherein said PVPP is in the form of water insoluble particles dispersed in polyvinylpyrrolidone to remove said contaminants from said water wherein said contaminants are selected from the group consisting of benzene, xylene, toluene, phenols and polyphenols; and separating said PVPP from said produced water.

2. The method of claim 1 wherein said PVPP is in the form of a water insoluble powder comprising particles having an average size of about 110 microns.

3. The method of claim 1 wherein said PVPP is in the form of a water insoluble powder comprising particles having an average size of about 25 microns.

4. The method of claim 1 wherein said PVPP is in the form of a water insoluble powder comprising particles having an average size of about 15 microns.

* * * * *